(12) United States Patent
Baumann et al.

(10) Patent No.: US 11,642,967 B2
(45) Date of Patent: May 9, 2023

(54) INDEPENDENT HIGH VOLTAGE INTERLOCKING LOOP SYSTEMS

(71) Applicant: Caterpillar Inc., Peoria, IL (US)

(72) Inventors: Jonathan M. Baumann, Hanna City, IL (US); Justin D. Middleton, Peoria, IL (US); Jason Lee Miller, Princeville, IL (US); Dustin Craig Selvey, Eureka, IL (US); Alexander C. Crosman, III, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 270 days.

(21) Appl. No.: 16/947,290

(22) Filed: Jul. 27, 2020

(65) Prior Publication Data

US 2022/0024318 A1 Jan. 27, 2022

(51) Int. Cl.
*H02J 7/00* (2006.01)
*H02J 7/14* (2006.01)
(Continued)

(52) U.S. Cl.
CPC ............. *B60L 3/0046* (2013.01); *B60L 53/20* (2019.02); *B60L 58/20* (2019.02); *B60L 2200/40* (2013.01); *B60L 2240/54* (2013.01)

(58) Field of Classification Search
CPC ........ B60L 3/0046; B60L 53/20; B60L 58/20; B60L 2200/40; B60L 2240/54
(Continued)

(56) References Cited

U.S. PATENT DOCUMENTS

| 3,874,472 A | 4/1975 | Deane |
| 10,274,532 B1 * | 4/2019 | Smith ..................... B60R 16/03 |

(Continued)

FOREIGN PATENT DOCUMENTS

| CN | 106799968 A | 6/2017 |
| CN | 109693544 A | 4/2019 |

(Continued)

OTHER PUBLICATIONS

Pandian, "Battery Sizing Basics: Tips for sizing battery protection devices and circuit conductors in telecom DC power systems," EC&M, Sep. 1, 2007 [Retrieved on Jul. 14, 2020 from https://www.ecmweb.com/content/article/20891072/battery-sizing-basics].

(Continued)

*Primary Examiner* — Alexis B Pacheco
(74) *Attorney, Agent, or Firm* — Harrity & Harrity, LLP (57) ABSTRACT

A machine may a first high voltage interlocking loop (HVIL) system to provide power to one or more components of the machine, the first HVIL system comprising: a plurality of groups of batteries; a plurality of disconnect components connected to the plurality of groups of batteries; a plurality of sets of contactors, a set of contactors, of the plurality of sets of contactors, being connected to a group of batteries of the plurality of groups of batteries. The machine may a second HVIL system to receive power from a power source, the second HVIL system comprising: a port configured to receive a connector of the power source and receive power, from the power source via the connector, to charge the plurality of groups of batteries, wherein the second HVIL system is independent with respect to the first HVIL system.

20 Claims, 3 Drawing Sheets

(51) Int. Cl.
 *B60L 3/00* (2019.01)
 *B60L 58/20* (2019.01)
 *B60L 53/20* (2019.01)

(58) Field of Classification Search
 USPC .................................................. 320/109, 104
 See application file for complete search history.

(56) References Cited

U.S. PATENT DOCUMENTS

| | | | |
|---|---|---|---|
| 2007/0284159 A1 | 12/2007 | Takami | |
| 2010/0291418 A1* | 11/2010 | Zhou | H01M 50/249 |
| | | | 429/96 |
| 2012/0244403 A1* | 9/2012 | Maskew | H01M 50/244 |
| | | | 429/99 |
| 2013/0299255 A1 | 11/2013 | Matsumura | |
| 2014/0062180 A1* | 3/2014 | Demmerle | B60L 58/00 |
| | | | 307/9.1 |
| 2016/0052409 A1* | 2/2016 | Sun | B60L 53/62 |
| | | | 320/109 |
| 2018/0154783 A1* | 6/2018 | Wang | B60L 58/27 |
| 2019/0184835 A1 | 6/2019 | Karlsson | |
| 2020/0164755 A1* | 5/2020 | Smolenaers | B60L 53/24 |
| 2020/0282853 A1* | 9/2020 | Paryani | B60L 58/20 |
| 2020/0298722 A1* | 9/2020 | Smolenaers | B60L 53/53 |
| 2021/0263113 A1* | 8/2021 | Yoshida | B60L 3/12 |

FOREIGN PATENT DOCUMENTS

| | | |
|---|---|---|
| CN | 110356236 | 10/2019 |
| WO | 2019088899 | 5/2019 |

OTHER PUBLICATIONS

Written Opinion and International Search Report for Int'l. Patent Appln. No. PCT/US2021/042507, dated Oct. 25, 2021 (8 pgs).

* cited by examiner

INDEPENDENT HIGH VOLTAGE INTERLOCKING LOOP SYSTEMS

TECHNICAL FIELD

The present disclosure relates generally to electric drive systems and, for example, to independent high voltage interlocking loop systems for a machine with an electric drive system.

BACKGROUND

An electric drive system for a work machine includes an engine, a generator, a direct current (DC) bus, and a traction motor. The engine may include an internal combustion engine and/or another power source that is configured to generate mechanical power for rotating a rotor relative to a stator of the generator. The generator may convert the mechanical power into electric power that can be supplied to different electrical loads of the work machine via the DC bus. The DC bus may include two or more electrical terminals across which multiple loads can connect and receive electrical power. For instance, the DC bus can be used to provide appropriate electrical power (e.g., via inverters, converters, and/or other circuitry) to the traction motor, an auxiliary device, and/or another load of the work machine. The traction motor may convert the electrical power into mechanical power (e.g, rotational power) suited to propel the work machine (e.g., via tracks, wheels, and/or other traction devices).

A high voltage interlock loop (HVIL) may be used in an electrical drive system. The HVIL may include a battery (e.g., traction battery) with a single set of contactors. The HVIL is typically configured such that the battery is disconnected from the work machine if the single set of contactors is disconnected, a charge port (associated with the battery) is connected to a power source, or a cover (for the charge port) is removed from the charge port. As a result, the HVIL may be disrupted and the work machine may remain inoperable until the HVIL is restored. Therefore, the HVIL is configured to disconnect the battery from the work machine each time the battery is charged or each time the battery is serviced, thereby resulting in numerous open and close cycles for the set of contactors associated with the HVIL. Subjecting the contactors to numerous open and close cycles can damage the contactors.

Chinese Patent Application Publication No. 109693544 (the '544 publication) discloses a kind of electric automobile high-voltage interlocking loops, including a main high-voltage interlocking circuit, and an air-conditioning high-voltage interlocking circuit that connects with the main high-voltage interlocking circuit by a CAN bus.

While the '544 publication discloses a main high-voltage interlocking circuit and an air-conditioning high-voltage interlocking circuit, the '544 publication does not address the issue of a battery being disconnected from the work machine each time the battery is charged or each time the battery is serviced.

The HVIL systems of the present disclosure solve one or more of the problems set forth above and/or other problems in the art.

SUMMARY

In some implementations, a machine may include a first high voltage interlocking loop (HVIL) system to provide power to one or more components of the machine, the first HVIL system comprising: a plurality of groups of batteries; a plurality of disconnect components connected to the plurality of groups of batteries; a plurality of sets of contactors, a set of contactors, of the plurality of sets of contactors, being connected to a group of batteries of the plurality of groups of batteries; and a second HVIL system to receive power from a power source, the second HVIL system comprising: a port configured to receive a connector of the power source and receive power, from the power source via the connector, to charge the plurality of groups of batteries, wherein the second HVIL system is independent with respect to the first HVIL system.

In some implementations, a system may comprise: a first system comprising: a plurality of groups of batteries configured to power to one or more components of a machine; a plurality of disconnect components connected to the plurality of groups of batteries, a disconnect component, of the plurality of disconnect components, being connected to a group of batteries of the plurality of groups of batteries, the disconnect component being configured to cause the group of batteries to be disconnected from the first system while one or more other groups of batteries, of the plurality of groups of batteries, remain connected to the first system to provide power to the one or more components; and a second system comprising: a port configured to receive a connector of a power source and receive power, from the power source via the connector, to charge the plurality of groups of batteries, wherein the first system is independent with respect to the second system.

In some implementations, a machine may comprise: a plurality of groups of batteries configured to power to one or more components of the machine; a plurality of disconnect components connected to the plurality of groups of batteries, wherein a disconnect component, of the plurality of disconnect components, is configured to cause a group of batteries, of the plurality of groups of batteries, to be disconnected from the machine while one or more other groups of batteries, of the plurality of groups of batteries, remain connected to the machine to provide power to the one or more components; and a port configured to receive a connector of a power source and receive power, from the power source via the connector, to charge the plurality of groups of batteries, wherein the plurality of groups of batteries are configured to continue to provide power to the one or more components when the port is disconnected from the connector and is disabled to prevent the port from outputting power.

DETAILED DESCRIPTION

This disclosure relates to high voltage interlock loop (HVIL) systems for a machine. The term "machine" may refer to a machine that performs an operation associated with an industry such as, for example, mining, construction, farming, transportation, or another type of industry. Moreover, one or more implements may be connected to the machine.

Figure 1:
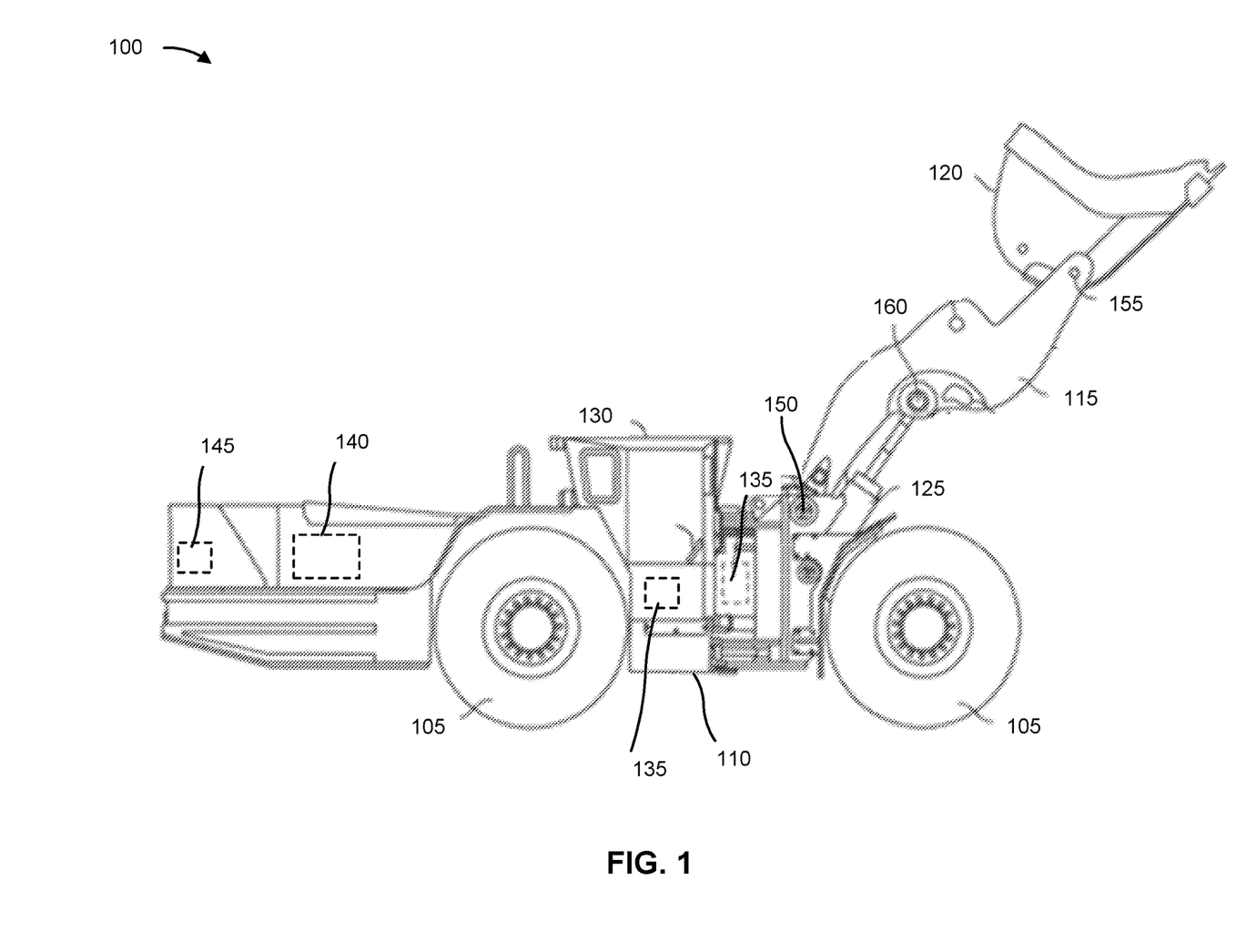
FIG. 1 is a diagram of an example machine described herein.

FIG. 1 is a diagram of an example machine 100 described herein. As shown in FIG. 1, the machine 100 is embodied as an underground loader (e.g., with an electric drive system). Alternatively, machine 100 may be another type of machine (e.g., with an electric drive system) such as a wheel loader, a dozer, and/or the like.

As shown in FIG. 1, machine 100 includes traction devices 105, a frame 110, a lift arm assembly 115, bucket 120, lift cylinders 125, operator cabin 130, controller 135 (e.g., an electronic control module (ECM)), battery compartments 140, charge ports 145, frame pivot point 150, bucket pivot point 155, and lift pivot point 160. As shown in FIG. 1, traction devices 105 are connected to frame 110 and include wheels. Additionally, or alternatively, traction devices 105 may include tracks, belts, or other traction devices. Lift arm assembly 115 is connected to frame 110 at frame pivot point 150 of frame 110 and connected to bucket 120 at bucket pivot point 155 of bucket 120. Lift arm assembly 115 may be configured to lift bucket 120 (e.g., away from frame 110).

As shown in FIG. 1, lift cylinders 125 are connected to frame 110 and connected to lift arm assembly 115 at lift pivot point 160. Lift cylinders 125 may be configured to raise lift arm assembly 115. Operator cabin 130 is supported by frame 110. Operator cabin 130 may include a control system. Control system may include one or more buttons, joysticks, levers, user interfaces, and/or the like used to control movement of machine 100. For instance, control system may include a control component (e.g., a button, a button, a user interface, and/or the like) that is configured to simultaneously disconnect batteries (included in battery compartments 140) from machine 100 and disable charge port 145 to prevent charge port 145 from outputting power.

Controller 135 may include one or more memories and one or more processors. The one or more memories may store information and/or instructions for use by one or more processors to perform one or more functions, as described below. For example, when performing the one or more functions, controller 135 may monitor a status of batteries included in battery compartments 140, monitor a status of charge ports 145, provide (e.g., to an operator associated with machine 100) information regarding the status of the batteries and/or the status of charge ports 145, and/or may control operation of machine 100 based on the status of the batteries and/or the status of charge port 145.

Battery compartments 140 (individually referred to as "battery compartment 140" and collectively referred to as "battery compartments 140") may include enclosures (e.g., boxes) that include a plurality of groups of batteries, a plurality of disconnect components, and a plurality of battery contactors. A disconnect component may include a device that is configured to be connected to a group of batteries (of the plurality of groups of batteries) and to be removed from the group of batteries. When removed, the disconnect component may cause the group of batteries to be disconnected from machine 100 by causing a set of the plurality of contactors (connected to the group of batteries) to be in an open state (e.g., disconnected from machine 100).

A contactor may include a device (e.g., a switch) that is configured to be in a closed state to connect the group of batteries to machine 100 or in an open state to disconnect the group of batteries from machine 100. In some implementations, machine 100 may include a single battery compartment 140. Alternatively, machine 100 may include two or more battery compartments 140. One or more groups of batteries, of the plurality of groups of batteries, may be configured to power (e.g., provide electrical power) to one or more components of machine 100.

A battery compartment 140 may include a portion of the plurality of groups of batteries, a portion of the plurality of disconnect components connected to the plurality of groups of batteries, and a portion of the plurality of contactors (hereinafter referred to "battery contactors") connected to the plurality of groups of batteries, as described in more detail below in connection with FIG. 3. A battery compartment 140 (e.g., a box) may be configured to be removed from machine 100 (e.g., to service one or more batteries included in such battery compartment 140).

The plurality of groups of batteries, the plurality of disconnect components, and the plurality of battery contactors may be included in a first HVIL system of machine 100 (hereinafter referred to as "battery HVIL system"). In some implementations, the battery HVIL system may include a plurality of HVIL circuits. For example, a first group of batteries, a corresponding first disconnect component, and a corresponding first set of battery contactors (e.g., two battery contactors) may form a first HVIL circuit. Similarly, a second group of batteries, a corresponding second disconnect component, and a corresponding second set of battery contactors (e.g., two battery contactors) may form a second HVIL circuit, and so on.

Charge ports 145 (referred to as "charge ports 145" collectively and referred to "charge port 145" individually) may be configured to receive power, from a power source (e.g., via a connector of the power source), to charge internal power sources of machine 100 (e.g., the plurality of groups of batteries of battery compartment 140). The power source may include batteries, a generator set (e.g., an electrical generator set), and/or the like. Charge ports 145 may be connected to machine 100 via a set of contactors (hereinafter referred to as "charge port contactors"). In some examples, the charge port contactors may include a positive contactor (e.g., a contactor to be connected to a positive terminal of a battery) and a negative contactor (e.g., a contactor to be connected to a negative terminal of the battery). In some implementations, machine 100 may include a single charge port 145. Alternatively, machine 100 may include two or more charge ports 145.

A charge port 145 may include a plurality of high voltage (HV) pins and a plurality of low voltage (LV) pins. In some examples, the plurality of high voltage (HV) pins (e.g., of a charge port 145) may include one or more ground pins, one or more positive pins (e.g., one or more DC bus positive pins), and/or one or more negative pins (e.g., one or more DC bus negative pins). The plurality of LV pins (e.g., of a charge port 145) may include an HVIL pin (e.g., to connect the charge port 145 to an HVIL system discussed below), one or more controller area network (CAN) pins (e.g., to enable CAN communications via the connector of the power source), one or more ground pins (e.g., a pin to monitor ground fault, a pin for ground connection, and/or the like), a wake up pin (e.g., to enable machine 100 to transition from an off state to an on state when the charge port 145 is connected to a power source).

As an example, the HVIL pin may enable high voltage via the HV pins when the HVIL pin is connected to the connector of the power source. Alternatively, the HVIL pin may cause the plurality of HV pins to be disabled when the HVIL pin is disconnected from the connector of the power source.

In some implementations, charge ports 145 may be included in a second HVIL system of machine 100 (hereinafter referred to as "charge port HVIL system"). The charge port HVIL system may operate separately and independently with respect to the battery HVIL system, as explained in more detail below. For example, the plurality of groups of batteries, of the battery HVIL system, may be configured to continue to provide power to the one or more components of machine 100 after one or more charge ports 145 and HV pins (of the one or more charge ports 145), of the charge port HVIL system, have been disabled (e.g., to prevent the one or more charge ports 145 and the HV pins from outputting power). The one or more charge ports 145 and HV pins may be disabled when the one or more charge ports 145 are exposed (e.g., are not connected to a power source).

For instance, the charge port contactors (of the one or more charge ports 145) may be in an open state to disconnect the one or more charge ports 145 from machine 100 (and, accordingly, the one or more charge ports 145 may be disabled) while the battery contactors may be in a closed state to maintain a connection between the plurality of groups of batteries and machine 100. According, the charge port HVIL system may be in an open state (e.g., disrupted) while the battery HVIL system remains in a closed state.

The charge port HVIL system may operate separately and independently from the battery HVIL system because the one or more charge ports 145 are connected to machine 100 via dedicated charge port contactors while the plurality of batteries are connected to machine 100 via dedicated battery contactors. In some examples, a first charge port 145 may be included in a first HVIL circuit and a second charge port 145 may be included in a second HVIL circuit. Accordingly, a first charge port 145 may be disabled while the second charge port 145 and the plurality of batteries remain connected to machine 100.

As indicated above, FIG. 1 is provided as an example. Other examples may differ from what was described in connection with FIG. 1.

Figure 2:
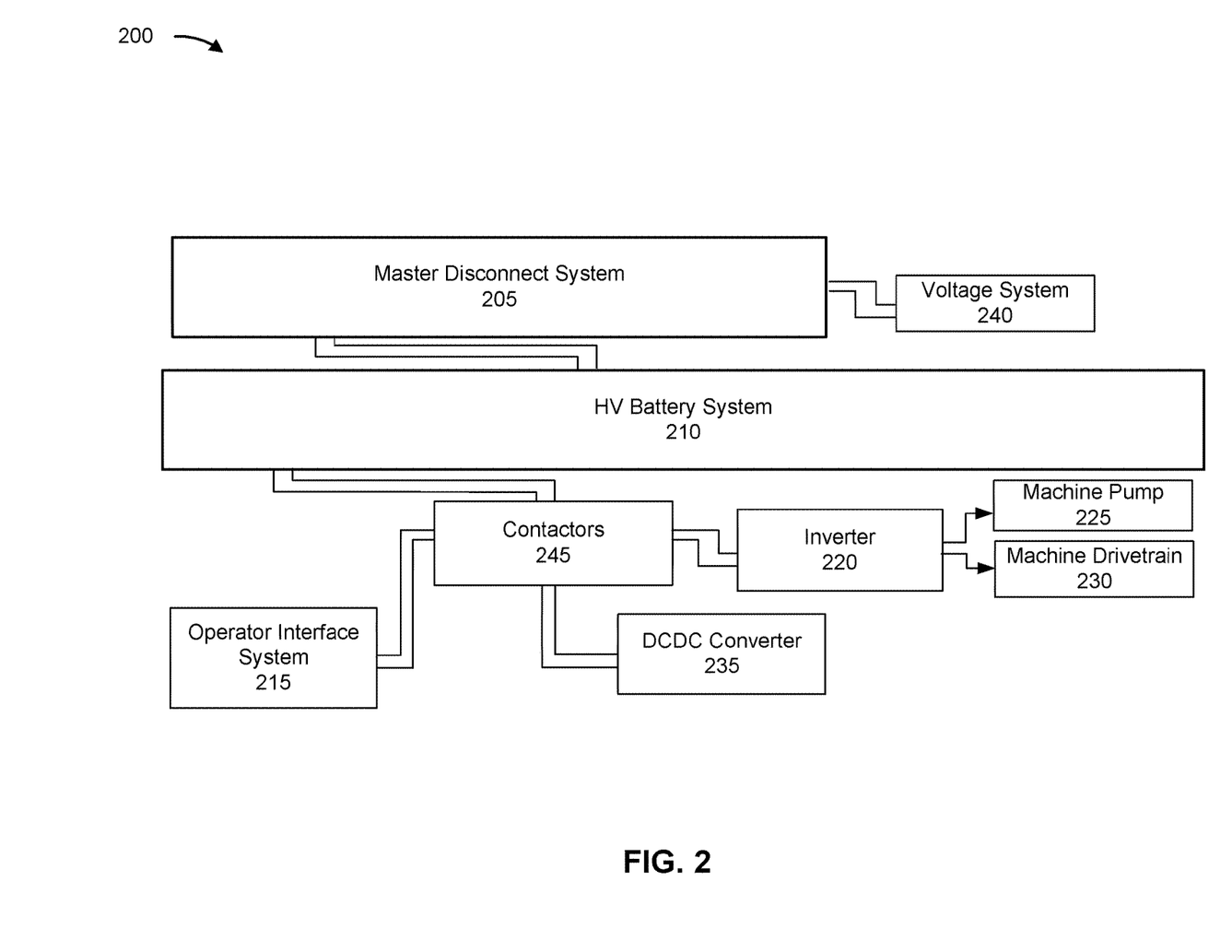
FIG. 2 is a diagram of an example system described herein.

FIG. 2 is a diagram of example system 200 described herein. As shown in FIG. 2, system 200 may include a master disconnect system 205, an HV battery system 210, an operator interface system 215, an inverter 220, machine pump 225, machine drivetrain 230, a DCDC converter 235, voltage system 240, and contactors 245.

Master disconnect system 205 may include one or more components configured to disconnect internal power sources (e.g., HV battery system 210 and/or voltage system 240) from machine 100. For example, by disconnecting HV battery system 210 from machine 100, master disconnect system 205 may enable components of machine 100 (e.g., excluding components of HV battery system 210) to be serviced without exposure to electrical power and current.

HV battery system 210 may include the plurality of groups of batteries, the plurality of disconnect components, and the battery contactors of one or more battery compartments 140. As an example, HV battery system 210 may include the plurality of groups of batteries, the plurality of disconnect components, and the battery contactors of two battery compartments 140. An arrangement of the plurality of groups of batteries, the plurality of disconnect components, and the battery contactors of a battery compartment 140 is described in more detail below in connection with FIG. 3.

Operator interface system 215 may include one or more charge ports 145. As discussed above, the one or more charge ports 145 may receive power, from a power source (e.g., connected to the one or more charge ports 145 via a connector (e.g., a cable) of the power source) to charge internal power sources of machine 100. For example, a first charge port 145 may be connected to a first power source and/or a second charge port 145 may be connected to a second power source. For instance, the first charge port 145 may be connected to the first power source and the second charge port 145 may be simultaneously connected to the second power source (e.g., to enable a fast charge of the internal power sources).

In some instances, a connection between the first charge port 145 and the first power source or between the second charge port 145 and the second power source may prevent movement of machine 100. For example, controller 135 may detect the connection between the first charge port 145 and the first power source or the connection between the second charge port 145 and the second power source and may prevent movement of machine 100 based on detecting the connection of a charge port and a power source.

For instance, controller 135 may detect the connection between the first charge port 145 and the first power source by detecting a CAN communication (e.g., via the CAN pins), detecting a wake up signal (e.g., via the wake up pin), detecting a HVIL signal (e.g., via the HVIL pin), and/or the like. In some examples, controller 135 may provide a notification (e.g., audible, visual, tactile, and/or the like) indicating that machine 100 is immobilized because a charge port 145 (e.g., the first charge port 145 or the second charge port 145) is connected to a power source.

The one or more charge ports 145 may be connected to a capping component (e.g., a cover) when the one or more charge ports 145 are not connected to the connectors of the power sources. For example, the first charge port 145 may be connected to a first capping component and/or the second charge port 145 may be connected to a second capping component. Thus, a charge port 145 (e.g., the first charge port 145 or the second charge port 145) may selectively receive (or may be selectively connected to) a power source or a capping component.

As discussed above, charge ports 145 may be included in the charge port HVIL system which is separate and independent from the battery HVIL system. The one or more charge ports 145 (and/or HV pins of the one or more charge ports 145) may be disabled (e.g., to prevent the one or more charge ports 145 and/or the HV pins from outputting power when the one or more charge ports 145 are exposed) without disrupting power provided by the plurality of groups of batteries of battery compartments 140 (e.g., to one or more components of machine 100). The one or more charge ports 145 may be exposed when the one or more charge ports 145 are not connected to either a power source or a capping component. The one or more charge ports 145 (and HV pins) may be disabled when the charge port contactors are in an open state (e.g., open) to prevent an arc flash event, prevent flow of electrical current, prevent electrocution, and/or the like via the one or more charge ports 145 (e.g., when the one or more charge ports 145 are exposed).

A charge port 145 (e.g., a first charge port 145) may be disabled based on various events as described below. For instance, the first charge port 145 may be disabled when the first charge port 145 is exposed. Additionally, or alternatively, the first charge port 145 may be disabled when a second charge port 145 is exposed.

In some implementations, controller 135 may detect that the first charge port 145 (or the second charge port 145) is exposed. For example, controller 135 may detect that one or more HV pins (of the first charge port 145 or the second charge port 145) are exposed (e.g., based on detecting no signal via the one or more HV pins).

In some examples, based on detecting that the first charge port 145 (or the second charge port 145) is exposed, controller 135 may disable movement of machine 100, provide a notification indicating movement of machine 100 is disabled (e.g., because the charge port 145 (or another charge port 145) is exposed), provide a notification to request that a parking brake be engaged (e.g., because the first charge port 145 (or the second charge port 145) is exposed), and/or the like. The notification may include an audible notification, a visual notification, a tactile notification, and/or the like and may be provided to an operator associated with machine 100.

Based on detecting that the first charge port 145 (or the second charge port 145) is exposed, the charge port contactors may transition from a closed state to an open state to disconnect the first charge port 145 (and/or the second charge port 145) and corresponding HV pins from machine 100, thereby disabling the first charge port 145 (and/or the second charge port 145) along with the corresponding HV pins.

The charge port contactors transitioning to the open state may cause the charge port HVIL system to be disrupted (e.g., cause the charge port HVIL to be open or broken). Conversely, the battery contactors may remain in a closed state, thereby maintaining a connection of the plurality of batteries to machine 100 and maintaining the battery HVIL system in a closed state. The battery contactors may remain in a closed state while the charge port contactors are in an open state as a result of the charge port HVIL system being separate and independent from the battery HVIL system.

Inverter 220 may include a device that converts power, from a DC power source, to AC power. For example, inverter 220 may convert power, from one or more batteries (of the plurality of batteries of HV battery system 210) to AC power. The AC power may be provided to one or more components of machine 100 such as, for example, machine pump 225 and/or machine drivetrain 230. In some instances, the AC power may be provided to a generator (not shown) and the generator may provide the AC power to machine pump 225 and/or machine drivetrain 230.

Inverter 220 may be connected to machine 100 via a set of contactors (hereinafter referred to as "inverter contactors"). The inverter contactors may include a positive contactor and a negative contactor. Machine pump 225 may include one or more pumps of one or more hydraulic components of machine 100. Machine drivetrain 230 may include a drivetrain of machine 100.

DCDC converter 235 may include a DC to DC converter that generates power that is supplied to one or more systems of machine 100 (e.g., one or more components that consume voltage that is lower than the voltage produced by one or more batteries of the pluralities of batteries of HV battery system 210). As example, DCDC converter may convert power generated by the one or more batteries from a first voltage (associated with the one or more batteries) to a second voltage that is lower than the first voltage.

DCDC converter 235 may be connected to machine 100 via a set of contactors (hereinafter referred to as "DC contactors"). The DC contactors may include a positive contactor and a negative contactor.

Contactors 245 may include a plurality of contactors that connect one or more components to machine 100. For example, contactors 245 may include charge port contactors, inverter contactors, DC contactors, and/or the like.

Figure 3:
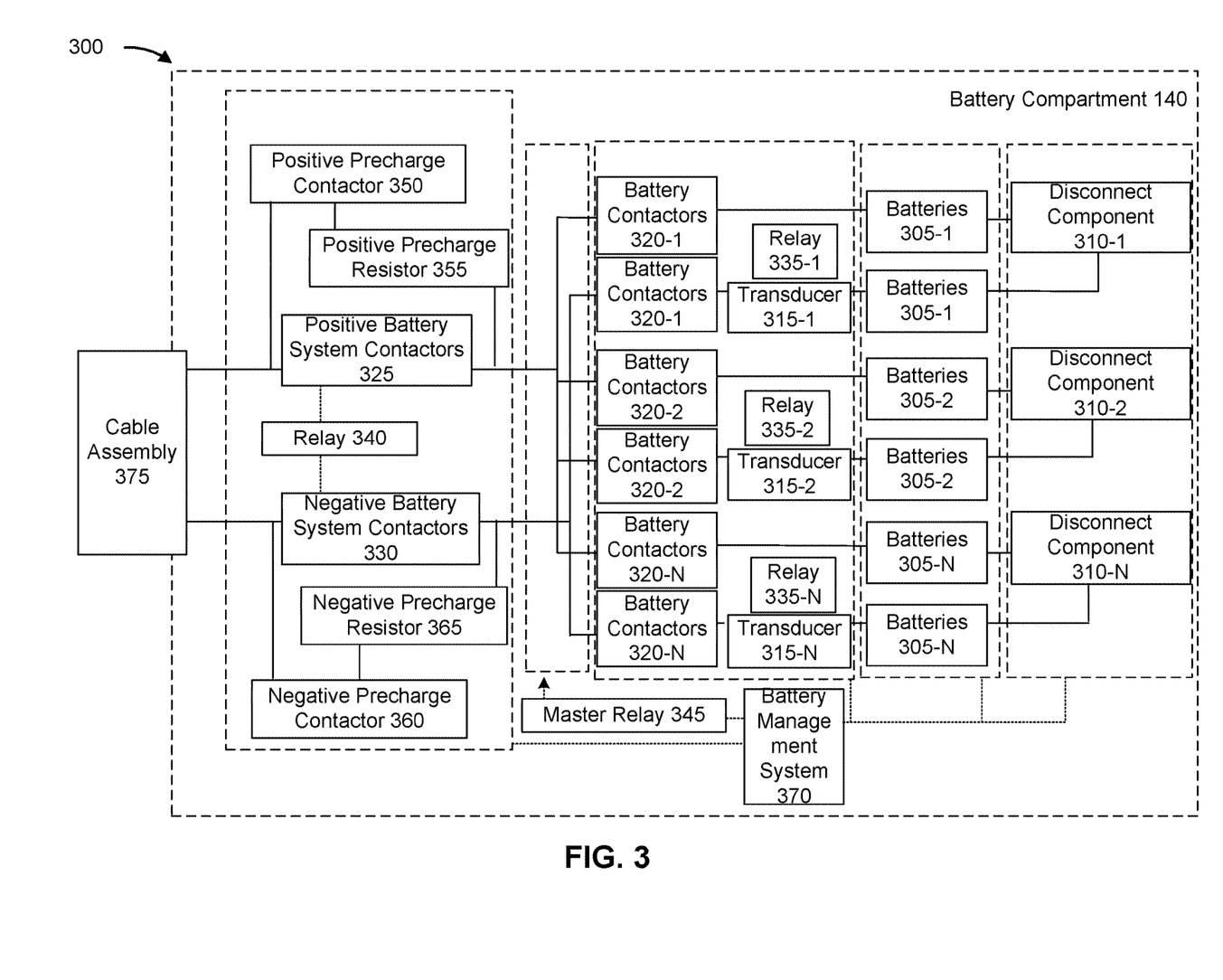
FIG. 3 is a diagram of an example implementation described herein.

FIG. 3 is a diagram of an example implementation 300 described herein. Example implementation 300 illustrates a battery compartment 140 of FIG. 1. As shown in FIG. 3, the battery compartment 140 includes one or more groups of batteries 305-1 through 305-N (N≥1) (hereinafter referred to collectively as "groups of batteries 305", and individually as "group of batteries 305"), one or more disconnect components 310-1 through 310-N (hereinafter referred to collectively as "disconnect components 310", and individually as "disconnect component 310"), one or more transducers 315-1 through 315-N (hereinafter referred to collectively as "transducers 315", and individually as "transducer 315"), one or more sets of battery contactors 320-1 through 320-N (hereinafter referred to collectively as "sets of battery contactors 320", and individually as "set of battery contactors 320"), positive battery system contactor 325, and negative battery system contactor 330.

As shown in FIG. 3, the battery compartment 140 may further include one or more battery relays 335-1 through 335-N (hereinafter referred to collectively as "battery relays 335", and individually as "battery relay 335"), a compartment relay 340, a master relay 345, a positive precharge contactor 350, a positive precharge resistor 355, a negative precharge contactor 360, a negative precharge resistor 365, a battery management system (BMS) 370, and a cable assembly 375.

Group of batteries 305 may include one or more batteries that generate and provide power to components of machine 100 (e.g., provide electrical power to electrical components of machine 100). For example, group of batteries 305 may include two or more batteries. In some instances, group of batteries 305 may be configured to implement a lockout tag out strategy. For example, in the event of a failure of or a need to service a group of batteries 305, the group of batteries 305 may remain disconnected until the group of batteries 305 is repaired or serviced.

As explained above, groups of batteries 305 may be included in the battery HVIL system. Groups of batteries 305 may be connected in parallel in the battery compartment 140. As shown in FIG. 3, group of batteries 305-1 may be connected to disconnect component 310-1, connected to transducer 315-1, and connected to set of battery contactors 320-1. The battery HVIL system may include a plurality of HVIL circuits. As an example, group of batteries 305-1 along with disconnect component 310-1, transducer 315-1, and/or set of battery contactors 320-1 may form a first HVIL circuit. Similarly, group of batteries 305-2 along with disconnect component 310-2, transducer 315-2, and/or set of battery contactors 320-2 may form a second HVIL circuit that operates separately and independently from the first HVIL circuit. Thus, different HVIL circuits may be formed to include a group of batteries 305, a disconnect component 310, a transducer 315, and/or a set of battery contactors 320.

Disconnect component 310 may include a device that is configured to be connected to a corresponding group of batteries 305 and to be removed from the corresponding group of batteries 305. For example, disconnect component 310 may be connected between a first set of batteries and a second set of batteries of the corresponding group of batteries 305. The quantity of batteries in the first set of batteries may be equal to the quantity of batteries in the second set of batteries. In some examples, disconnect component 310 may be comprise a fuse.

When removed, disconnect component 310 may cause the corresponding group of batteries 305 to be disconnected from machine 100 by causing a corresponding set of battery connectors 320 (connected to the corresponding group of batteries 305) to be in an open state. Disconnect component 310 may cause the corresponding group of batteries 305 to be disconnected from machine 100 without causing one or more other groups of batteries 305 to be disconnected from machine 100. For example, a first groups of batteries 305 and/or a second groups of batteries 305 may remain connected to machine 100 while a third group of batteries is disconnected from machine 100.

Transducer 315 may include a device that measures an amount of current flowing via a corresponding group of batteries 305. Transducer 315 may be connected to the corresponding group of batteries 305. For example, transducer 315 may be connected to a negative terminal of the corresponding group of batteries 305. Set of battery contactors 320 may include a set of devices (e.g., a set of switches) that is configured to be in a closed state to connect the corresponding group of batteries 305 to machine 100 or to be in an open state to disconnect group of batteries 305 from machine 100. As discussed, set of battery contactors 320 may remain in a closed state to connect the corresponding group of batteries 305 to machine 100 while set of charge port connectors are in an open state.

Set of battery contactors 320 may include a positive contactor and a negative contactor. The positive contactor may be connected to a positive terminal of the corresponding group of batteries 305 and the negative contactor may be connected to transducer 315. Positive connectors of sets of battery contactors 320 may be connected (e.g., in series) to positive battery system contactor 325. Negative connectors of sets of battery contactors 320 may be connected (e.g., in series) to negative battery system contactor 330. In some implementations, positive battery system contactor 325 and negative battery system contactor 330 may provide redundancy and reliability in the event of a failure of a group of batteries 305 and/or a failure of a corresponding set of battery contactors 320.

With respect to redundancy and reliability, assume that group of batteries 305-1 is experiencing a failure and that a set of battery contactors 320-1, associated with the group of batteries 305-1, is also experiencing a failure (e.g., the contactors remain closed instead of being in an open state due to the failure of the group of batteries 305-1). Further assume that the group of batteries 305-1 needs to be serviced to remedy the failure. In this instance, positive battery system contactor 325 and negative battery system contactor 330 can be opened to terminate any output of electrical power (and electrical current) associated with the group of batteries 305-1 and enable the group of batteries 305-1 to be serviced. Accordingly, positive battery system contactor 325 and negative battery system contactor 330 may provide a second layer of protection (e.g., from power and current) in the event of a failure of a first layer of protection provided by a set of battery contactors 320.

Battery relay 335 may include an electromechanical relay, a solid state relay, and/or the like. In some examples, battery relay 335 may be connected to a corresponding set of battery contactors 320. Compartment relay 340 may include an electromechanical relay, a solid state relay, and/or the like. In some examples, compartment relay 340 may be connected between positive battery system contactor 325 and negative battery system contactor 330. Master relay 345 may include an electromechanical relay, a solid state relay, and/or the like. Master relay 345 may be connected between master disconnect system 205 and battery compartment 140.

Positive precharge contactor 350 may include a contactor that is connected to positive battery system contactor 325. Positive precharge resistor 355 may include a resistor that is connected to positive precharge contactor 350 and connected to positive battery system contactor 325. Positive precharge contactor 350 and positive precharge resistor 355 may be connected to positive battery system contactor 325 to control a current flowing from groups of batteries 305 at an initial startup of machine 100 (e.g., to prevent a rush of current from groups of batteries 305).

Negative precharge contactor 360 may include a contactor that is connected to negative battery system contactor 330. Negative precharge resistor 365 may include a resistor that is connected to negative precharge contactor 360 and connected to negative battery system contactor 330. Negative precharge contactor 360 and negative precharge resistor 365 may be connected to negative battery system contactor 330 to control a current flowing from groups of batteries 305 at an initial startup of machine 100 (e.g., to prevent a rush of current from groups of batteries 305).

Battery management system 370 may include a device that is connected to one or more components of the battery compartment 140 and that is configured to monitor such one or more components. In some implementations, battery management system 370 may be implemented using controller 135. For example, battery management system 370 (e.g., via controller 135) may detect when disconnect component 310 is removed from a corresponding group of batteries 305 and provide a notification (e.g., audible, visual, tactile, and/or the like) indicating that disconnect component 310 has been removed, information identifying disconnect component 310, information identifying the corresponding group of batteries 305, and/or the like. As an example, the notification may be provided to the operator.

Additionally, or alternatively, battery management system 370 may monitor a state of charge (SOC), a temperature, a voltage, and/or the like of one or more groups of batteries 305 and may provide a notification (e.g., audible, visual, tactile, and/or the like) regarding the SOC, the temperature, the voltage, and/or the like of the one or more groups of batteries 305. As an example, the notification may be provided to the operator.

Connectors (e.g., cables, wiring, and/or the like) of components of the battery compartment 140 may form cable assembly 375. Cable assembly 375 may be configured to connect the battery compartment 140 to machine 100.

INDUSTRIAL APPLICABILITY

This disclosure relates to implementing multiple independent high voltage interlock loop (HVIL) systems in a machine. Using a single HVIL in a machine causes a battery (of the machine) to be disconnected from the machine each time the battery is charged or each time the battery is serviced. As a result of the battery being disconnected from the machine, the machine may remain inoperable until the battery is reconnected. Accordingly, using a single HVIL may waste machine resources that are used to shut down the machine (e.g., for service, for battery charge, and/or the like), may waste machine resources that are used to shut down the machine when the battery is disconnected from the machine, and may waste machine resources that are used to power up the machine when the battery is reconnected to the machine. Additionally, if the machine includes multiple batteries, using a single HVIL may waste machine resources that are used to reconnect the multiple batteries to the machine.

The disclosed independent HVIL systems may resolve the issues mentioned above. For example, the disclosed independent HVIL systems includes an HVIL system for groups of batteries of a machine and an HVIL system for charge ports of the machine. Additionally, different groups of batteries may form different independent HVIL circuits. Several advantages may be associated with the disclosed independent HVIL systems.

For example, the disclosed independent HVIL systems enable the groups of batteries to remain connected to the machine when the charge ports are disabled or when the charge ports are receiving a charge from power sources. Additionally, the disclosed independent HVIL systems may enable a group of batteries to remain connected to the machine while another group of batteries is disconnected from the machine. By enabling the groups of batteries to remain connected to the machine, the disclosed independent HVIL systems may preserve computing or machine resources that would have otherwise been used to shut down the machine (e.g., for service, for battery charge, and/or the like), to shut down the machine when the battery is disconnected from the machine, to power up the machine when the battery is reconnected from the machine, and to reconnect multiple batteries to the machine.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A machine, comprising:
    a first high voltage interlocking loop (HVIL) system to provide power to one or more components of the machine, the first HVIL system comprising:
        a plurality of groups of batteries,
            wherein the plurality of groups of batteries are connected in parallel in the first HVIL system;
        a plurality of disconnect components connected to the plurality of groups of batteries,
            wherein a disconnect component, of the plurality of disconnect components, is connected in series to a group of batteries of the plurality of groups of batteries, and
            wherein the disconnect component is configured to cause the group of batteries to be disconnected from the first HVIL system while one or more other groups of batteries, of the plurality of groups of batteries, remain connected to the first HVIL system to provide power to the one or more components;
        a plurality of sets of contactors,
            wherein a set of contactors, of the plurality of sets of contactors, is connected to the group of batteries; and
    a second HVIL system to receive power from a power source, the second HVIL system comprising:
        a port configured to receive a connector of the power source and receive power, from the power source via the connector, to charge the plurality of groups of batteries, wherein the second HVIL system is independent with respect to the first HVIL system.

2. The machine of claim 1,
    wherein the set of contactors includes:
        a positive contactor connected to the group of batteries, and
        a negative contactor connected to the group of batteries.

3. The machine of claim 1, wherein the port comprises a plurality of high voltage (HV) pins and a plurality of low voltage (LV) pins, and
    wherein the plurality of LV pins comprise an HVIL pin.

4. The machine of claim 1, wherein the port is configured to be disabled to prevent the port from outputting power when the port is disconnected from the connector, and
    wherein the plurality of groups of batteries are configured to continue to provide power to the one or more components after the port has been disabled.

5. The machine of claim 1,
    wherein the group of batteries is a first group of batteries that forms a first HVIL circuit, and
    where a second group of batteries, of the plurality of groups of batteries, forms a second HVIL circuit that is separate and independent from the first HVIL circuit.

6. The machine of claim 1, wherein the port is a first port,
    wherein the second HVIL system further comprises a second port, and
    wherein the second port is configured to receive the connector of the power source and receive power, from the power source via the connector, to charge the plurality of groups of batteries when the connector is not connected to the first port.

7. The machine of claim 1, further comprising:
    a control component configured to simultaneously disconnect the plurality of groups of batteries from the first HVIL system and disable the port, of the second HVIL system, to prevent the port from outputting power.

8. The machine of claim 1, further comprising a controller configured to:
    determine whether the port is disconnected from the connector; and
    selectively:
        disable movement of the machine when the port is connected to the connector, and
        provide a notification indicating that the port is disconnected from the connector when the port is disconnected from the connector.

9. A system comprising:
    a first system comprising:
        a plurality of groups of batteries configured to power to one or more components of a machine,
            wherein the plurality of groups of batteries are connected in parallel in the first system;

a plurality of disconnect components connected to the plurality of groups of batteries,
wherein a disconnect component, of the plurality of disconnect components, is connected in series to a group of batteries of the plurality of groups of batteries, and
wherein the disconnect component is configured to cause the group of batteries to be disconnected from the first system while one or more other groups of batteries, of the plurality of groups of batteries, remain connected to the first system to provide power to the one or more components; and
a second system comprising:
a port configured to receive a connector of a power source and receive power, from the power source via the connector, to charge the plurality of groups of batteries, wherein the first system is independent with respect to the second system.

10. The system of claim 9, where the first system further comprises a plurality of sets of contactors, and
wherein a set of contactors, of the plurality of sets of contactors, is connected to the group of batteries.

11. The system of claim 9, wherein the disconnect component is connected between a first set of batteries and a second set of batteries of the group of batteries, and
wherein the disconnect component comprises a fuse.

12. The system of claim 9, wherein the first system is a first high voltage interlocking loop (HVIL) system and the second system is a second HVIL system.

13. The system of claim 9, wherein the port comprises a plurality of high voltage (HV) pins and a plurality of low voltage (LV) pins, and
wherein LV pins, of the plurality of LV pins, comprise a high voltage interlocking loop (HVIL) pin that disables the plurality of HV pins when the HVIL pin is disconnected from the connector of the power source.

14. The system of claim 9, wherein the port is configured to be disabled to prevent the port from outputting power when the port is disconnected from the connector, and
wherein the plurality of groups of batteries are configured to continue to provide power to the one or more components when the port is disconnected from the connector.

15. The system of claim 9, wherein the port is a first port, and
wherein the second system further comprises a second port, and
wherein the first port and the second port are configured to selectively receive the connector of the power source or a capping component.

16. The system of claim 9, wherein the group of batteries is a first group of batteries that forms a first high voltage interlocking loop (HVIL) circuit, and
where a second group of batteries, of the plurality of groups of batteries, forms a second HVIL circuit that is separate and independent from the first HVIL circuit.

17. A machine comprising:
a plurality of groups of batteries configured to power to one or more components of the machine,
wherein the plurality of groups of batteries are connected in parallel;
a plurality of disconnect components connected to the plurality of groups of batteries,
wherein a disconnect component, of the plurality of disconnect components, is configured to cause a group of batteries, of the plurality of groups of batteries, to be disconnected from the machine while one or more other groups of batteries, of the plurality of groups of batteries, remain connected to the machine to provide power to the one or more components, and
wherein the disconnect component is connected in series to the group of batteries; and
a port configured to receive a connector of a power source and receive power, from the power source via the connector, to charge the plurality of groups of batteries,
wherein the plurality of groups of batteries are configured to continue to provide power to the one or more components when the port is disconnected from the connector and is disabled to prevent the port from outputting power.

18. The machine of claim 17, wherein the plurality of groups of batteries, the plurality of disconnect components, and a plurality of sets of contactors are included in a first high voltage interlocking loop (HVIL) system, and
wherein the port is included in a second HVIL system that is separate and independent from the first HVIL system.

19. The machine of claim 17, wherein the port comprises a plurality of high voltage (HV) pins and a plurality of low voltage (LV) pins,
wherein LV pins, of the plurality of LV pins, comprise a high voltage interlocking loop (HVIL) pin, and
wherein HV pins, of the plurality of HV pins, are configured to be disabled to prevent the HV pins from outputting power when the port is disconnected from the connector.

20. The machine of claim 17, wherein the port is a first port, and
wherein the machine further comprises a second port, and
wherein the first port and the second port are configured to selectively receive the connector of the power source or a capping component.

* * * * *